United States Patent [19]
Marumo et al.

[11] 3,840,088
[45] Oct. 8, 1974

[54] INERTIA-RESPONSIVE SWITCHING DEVICE

[75] Inventors: Nagayuki Marumo; Shunji Matsui; Kenzo Hirashima, all of Yokohama, Japan

[73] Assignee: Nissan Motor Company Limited, Yokohama, Japan

[22] Filed: Nov. 13, 1972

[21] Appl. No.: 306,056

[30] Foreign Application Priority Data
Nov. 16, 1971 Japan.............................. 46-107324
Dec. 31, 1971 Japan.............................. 46-3395
Jan. 8, 1972 Japan.............................. 47-5688
Jan. 8, 1972 Japan.............................. 47-5689

[52] U.S. Cl............... 180/105 R, 180/82, 180/103, 200/61.45 M, 307/10 R, 340/52 H
[51] Int. Cl............................................ B60n 21/00
[58] Field of Search............ 180/103, 105 R, 105 E, 180/110, 107, 82 R; 280/150 AB; 340/52 H, 61; 307/10 R; 200/61.45 R, 61.45 M, 61.53

[56] References Cited
UNITED STATES PATENTS

| | | | |
|---|---|---|---|
| 2,265,524 | 12/1941 | Fruth................... | 180/110 |
| 2,997,557 | 8/1961 | Gillmor et al................ | 200/61.53 |
| 3,256,397 | 6/1966 | Wintriss......................... | 200/61.53 |
| 3,495,675 | 2/1970 | Hass et al..................... | 280/150 AB |
| 3,619,524 | 11/1971 | Gillund..................... | 200/61.45 M |
| 3,639,710 | 2/1972 | Haruna..................... | 280/150 AB |
| 3,655,929 | 4/1972 | Engel..................... | 280/150 AB |
| 3,678,763 | 7/1972 | Brooks..................... | 200/61.45 M |
| 3,708,031 | 1/1973 | Jania................... | 180/110 |
| 3,715,003 | 2/1973 | Jubenville..................... | 180/103 |

*Primary Examiner*—David Schonberg
*Assistant Examiner*—John P. Silverstrim

[57] ABSTRACT

Herein disclosed is an improved inertia-responsive switching device for use in a motor vehicle safety device for the purpose of protecting a vehicle occupant from an injury in the event of a collision encountered by a motor vehicle, the switching device including an inertia-responsive magnetic mass member which is urged to a rest position by a first biasing force which is exerted by a permanent magnet or a suitable spring and a second biasing force which is established by an electromagnet energized and de-energized in a controlled fashion. During relatively high-speed driving of the motor vehicle, the magnetic mass member is subjected only to the first biasing force in the absence of the second biasing force. During a condition in which the motor vehicle is being driven at a relatively low speed, however, the magnetic mass member is subjected to the combined forces from the permanent magnet or spring and the electromagnet. The safety device is in this manner actuated to its protective position only when a serious collision condition is encountered by the motor vehicle in which the magnetic mass member is subjected to a force of inertia larger than predetermined magnitudes which are different depending upon the vehicle speeds.

6 Claims, 16 Drawing Figures

PATENTED OCT 8 1974 3,840,088

INERTIA-RESPONSIVE SWITCHING DEVICE

The present invention relates to motor vehicle safety devices and, more particularly, to switching devices which are adapted for specific use in the motor vehicle safety devices for actuating them to protective conditions in the event of collisions encountered by the motor vehicles.

The motor vehicle safety device of the most widely accepted character uses an unflatable protector bag or a stretchable protector net which is usually stowed in a collapsed of folded condition when held inoperative. The protector bag or net is connected to suitable actuating means which is usually a source of a fluid under pressure in the safety device of the type using the inflatable protector bag, the source being closed under a normal condition. The actuating means in any form is adapted to instantaneously expand the protector bag or stretch the protector net to a protective position as soon as the collision condition is encountered by the motor vehicle. The protector bag or net which is thus brought into the protective position usually intervenes between a vehicle occupant and some structural parts in a vehicle cable such as for example a steering wheel, an instrument panel, a windshield and a seat back. The vehicle occupant who is violently flung or bounded around during the collision condition is relatively softly received or captured by the suddenly expanded protector bag or stretched protector net so that a major portion of the energy of impact on the vehicle occupant is absorbed by the bag or net. The vehicle occupant can thus be protected from incurring a serious injury in the event of the collision of the motor vehicle.

For the purpose of providing satisfactory assurance of safety of the vehicle occupant during the collision condition, it is of critical importance that the protector bag or net be projected and expanded or stretched to the protective position as rapidly as possible at an insipient stage of the collision condition. The actuating means for the protector bag or net should therefore be capable of responding to the collision condition instantaneously when the collision is brought about on the motor vehicle. For this purpose, the motor vehicle safety device of the described general character includes an impact detecting arrangement which is responsive to the collision condition of the motor vehicle and operative to cause the actuating means to immediately expand the protector bag or stretch the protector net to the protective position.

Various types of impact detecting arrangement have thus far been proposed, one of such arrangements using an inertia-responsive switching device which is adapted to be responsive to a sudden change of acceleration caused as a result of the collision. The impact detecting arrangement of this particular nature has stationary and movable contacts which are electrically connected between a source of power and an input terminal of an electrical circuit of the actuating means for the protector bag or net. The movable contact is typically in the form of a solid magnetic ball or pendulum of an electrically conductive ferromagnetic material and is thus capable of acting as an inertia-responsive mass member which is moved from its initial position when subjected to a force of inertia greater than a predetermined magnitude. The solid magnetic ball or pendulum is placed in a magnetic field which is constantly built up by a permanent magnet positioned relative to the magnetic ball or pendulum and is usually held in a rest or inoperative position at a spacing from the stationary contact under an influence of an attractive action exercised on the ball or pendulum from the magnetic field. The intensity of the magnetic field is predetermined in such a manner that the magnetic ball or pendulum can be freed of the restraint of the magnetic field when the force of inertia greater than the predetermined intensity of the magnetic field is applied to the ball or pendulum as in the case of the collision of the motor vehicle. The magnetic ball or pendulum thus moved from its initial rest position strikes upon the associated stationary contact so as to complete an electrical circuit between the power source and the input terminal of the actuating means of the protector bag or net through the magnetic ball or pendulum which in this condition serves as the movable contact as well as the inertia-responsive mass member.

The prior art inertia-responsive switching devices of the above outlined character are advantageous for their relatively simple construction which is easy and economical to manufacture on a large-scale production basis and which is ready for installation on the motor vehicle usually having limited room for accommodation of such device. Some drawbacks are, however, pointed out as being inherent in the existing inertia-responsive switching and, thus, the present invention contemplates provision of an improved inertia-responsive switching device which is free from such drawbacks.

In order to reliably protect the vehicle occupant during the collision condition and to enable the driver to have a sustained control over the steering of the motor vehicle, it is necessary that the safety device be actuated only when a violent impact is caused on the motor vehicle or, in other words, the inertia-responsive switching device be closed solely when an acceleration higher than a predetermined rate is developed in the motor vehicle as a result of the violent collision. It is, in this instance, known that the rate of acceleration resulting from the collision becomes the higher as the motor vehicle encounters the collision when being driven at the higher velocity. The inertia-responsive switching device should therefore be closed only when the collision is encountered while the motor vehicle is being driven at a velocity higher than a predetermined level and be kept open when shocks are applied to the motor vehicle which is being driven at a velocity lower than the particular level.

The actuation of the protector unit such as the bag or net into the protective position is completed at an appreciably retarded timing (which is usually of the order of microseconds) after the actuating means for the protector unit has been initiated into action. When, thus, the collision is encountered by the motor vehicle being driven at a velocity higher than the above mentioned predetermined limit, it is required that the switching device for the actuating means respond to the collision condition at an incipient stage of the condition. For this reason, the inertia-responsive switching device should be so constructed and arranged as to be closed in response to the predetermined rate of acceleration which is developed within the initial stage of the collision condition. This particular rate of acceleration is, however, also reached and accordingly the protector bag or net actuated to the protective position under a condition in which the motor vehicle is subjected to shocks or impacts of a relatively light degree unlikely to invite a serious damage on the vehicle or an injury on the vehicle occupant when the motor vehicle is being driven at a relatively low velocity. The prior art inertia-responsive switching device of the type which is responsive to an acceleration higher than the predetermined rate is thus inoperable to be actuated selectively depending upon the seriosity or nature of the impact on the motor vehicle.

An electric switching circuit has therefore been proposed in which the inertia-responsive switch is serially connected to a vehicle-velocity-responsive switch between the power source and the actuating means for the protector unit. The vehicle-velocity-responsive switch is kept open while the motor vehicle is being driven at a velocity lower than a predetermined level so that the actuating means for the protector unit is inoperative when an impact is imparted to the motor vehicle being driven at a relatively low speed and thus the acceleration resulting from the impact is relatively low.

It, however, sometimes happen that a motor vehicle being held at a standstill or driven at a relatively low speed is brought into violent collision with another motor vehicle which is cruising at a high speed. Under this condition, the former vehicle would sustain serious damage and accordingly the occupant thereof suffer a severe injury in the absence of protection by the safety device which is held inoperative with its velocity-responsive switch kept open. Similar results would be invited when a motor vehicle encounters a violent collision while the vehicle is skidding on a slippery road in which condition the velocity-responsive switch is held open so that the actuating means for the protector unit is inoperative. The motor vehicle safety device using the combination of the inertia-responsive and vehicle-velicity responsive switches thus happens to fail to be actuated even when the motor vehicle comes into collision resulting in development of an acceleration of such a rate as to expose the vehicle occupant to a serious injury. The present invention therefore contemplates provision of an improved inertia-responsive switching device which is free from all of the drawbacks above pointed out.

It is accordingly an important object of the present invention to provide an improved inertia-responsive switching device which is reliable in responding to a collision condition involving a critically increased acceleration.

It is another important object of the invention to provide an improved inertia-responsive switching device for a motor vehicle safety device, the switching device being responsive to an increased acceleration developed in the motor vehicle under various conditions such as the high-speed driving, low-speed driving and rest conditions of the vehicle.

It is still another important object of the invention to provide an improved inertia-responsive switching device of a motor vehicle safety device, the switching device being adapted to remain open when subjected to a relatively light impact during low-speed driving of the motor vehicle and closed in response to an impact causing a serious collision condition under any driving or rest condition of the motor vehicle.

It is still another important object of the invention to provide an improved inertia-responsive switching device of a motor vehicle safety device, which switching device is adapted to be closed when subjected to an acceleration higher than a predetermined rate during high-speed driving of the motor vehicle and to an acceleration higher than another predetermined rate which is higher than the former predetermined rate during low-speed driving or when the motor vehicle is held at a standstill or on the skid while being driven at a high speed on a slippery road surface.

These objects of the present invention will be advantageously accomplished in an inertia-responsive switching device comprising an inertia-responsive mass member which is formed of an electrically conductive material and which is constantly electrically connected to one of electrical input and output leads, a stationary contact which is positioned relative to the inertia-responsive mass member and which is electrically connected to the other of the input and output leads, first biasing means adapted to impart a first biasing force to the inertia-responsive mass member for urging the mass member to a rest position which is spaced apart from the stationary contact so that the input and output leads remain disconnected from each other, the inertia-responsive mass member being allowed to move from the rest position into contact with the stationary contact for providing an electrical connection between the input and output leads when the mass member is subjected to an acceleration higher than a first predetermined rate, second biasing means operative to impart a second biasing force to the inertia-responsive mass member when actuated, the second biasing force being combined with the first biasing force for allowing the inertia-responsive mass member to move into contact with the stationary contact in response to an acceleration higher than a second predetermined rate, and control means responsive to a predetermined physical condition of the motor vehicle for actuating the second biasing means when subjected to such a physical condition.

The inertia-responsive mass member thus serving a movable contact in the switching device according to the present invention is preferably a solid magnetic ball or pendulum which is formed of not only an electrically conductive but ferromagnetic material. In this instance, the first biasing means may be a permanent magnet establishing a magnetic force with an intensity which is predetermined to restrain the magnetic ball or pendulum in the rest or inoperative position when the ball or pendulum is subjected to an acceleration lower than the above mentioned first predetermined rate and to allow the ball or pendulum to be freed of the restraint when subjected to an acceleration higher than the first predetermined rate. The second biasing means, on the other hand, may be an electromagnet which is in the form of a solenoid coil wound on the permanent magnet as the first biasing means or on an independent magnet core. The solenoid coil may be wound on the permanent magnet or the independent magnet core in a manner to build up a magnetic field having poles which are in agreement with those of the magnetic field of the permanent magnet so that the magnetic ball or pendulum undergoes the magnetic force from the electromagnet in addition to that from the permanent magnet when the solenoid coil is excited or in a manner to build up a magnetic field having poles which are opposite to those of the permanent magnet so that the magnetic force from the permanent magnet is counter biased by the electromagnet which the solenoid coil is excited. Or otherwise, the second biasing means may comprise a solenoid-operated plunger which is adapted to hold the magnetic ball or pendulum in the rest or inoperative position through releasable direct or indirect engagement therewith. The solenoid-operated plunger is moved away from the magnetic ball or pendulum when actuated (viz., when the solenoid coil is energized or deenergized depending upon the direction of winding of the coil) so that the ball or pendulum is freed of the mechanical restraint of the plunger. Where the inertia-responsive mass member in the form of the pendulum is preferred, the solenoid-operated plunger may be in releasable engagement with the weight of the pendulum through a ball member which is in contact at its lowermost end with the plunger and at its uppermost end with the weight of the pendulum.

The control means of the inertia-responsive switching device using the first and second biasing means of the above described specific constructions may comprise a vehicle-velocity responsive switch which is connected across the solenoid coil of the second biasing means. This vehicle-velocity-responsive switch may be so arranged as to be open in response to a vehicle velocity higher than a predetermined level and to close when the vehicle velocity is lower than the particular level. In this instance, the solenoid coil of the second biasing means should be wound in a direction providing a magnetic field having poles which are in agreement with those of the permanent magnet as the first biasing means so that the magnetic ball or pendulum is subjected to an increased magnetic force when the vehicle-velocity-responsive switch is closed, viz., when the motor vehicle is being driven at a relatively low speed. The vehicle-velocity-responsive switch may be otherwise so biased as to open in response to a vehicle velocity lower than the predetermined level, in which instance the solenoid coil of the second biasing means should be wound in a direction to provide a magnetic field having poles opposite to those of the permanent magnet so that the magnetic ball or pendulum is invariably subjected to the increased magnetic force when the motor vehicle is being driven at a relatively low speed.

The magnetic force built up by the second biasing means having any of the constructions above described and the vehicle-velocity-responsive switch are usually arranged in such a manner that the combined magnetic forces from the first and second biasing means are substantially equal to the force of inertia corresponding to the previously noted second predetermined rate of acceleration. To prevent unwanted actuation of the protector unit during low-speed driving of the motor vehicle, it is important that the second predetermined rate of acceleration be set at a considerably high level. Where, thus, the second biasing means using the electromagnet is constructed in a manner to establish an open magnetic circuit together with the magnetic ball or pendulum in the rest or inoperative position, a considerable amount of leakage flux will be produced and, as a consequence, a relatively large current should be supplied to the solenoid coil of the electromagnet for the purpose of building up the magnetic field which is enough to provide the restraint against the acceleration higher than the above mentioned second predetermined rate. The use of such a large current gives rise to an increase in the heat generated in the solenoid coil and thus results in a shortened service life of the switching device as a whole, let alone the problem of an increased power consumption.

It is, therefore, further and another important object of the present invention to provide an improved inertia-responsive switching device of the described nature and further featuring a prolonged service life and a minimized power consumption.

It is further and another important object of the invention to provide an improved inertia-responsive switching device including an inertia-responsive magnetic mass member and an electromagnet which is operable on a minimized current and which is accordingly free from generation of heat during operation.

Yet, it is an important object of the invention to provide an improved inertia-responsive switching device including an inertia-responsive magnetic mass member and an electromagnet which is adapted to build up a closed magnetic circuit together with the magnetic mass member when the mass member is biased to its rest or inoperative position.

In the inertia-responsive switching device of the specific construction in which the electromagnet is kept energized so as to the magnetic force reinforcing that established by the permanent magnet during low-speed driving of the motor vehicle, the intensity of the magnetic field built up by the permanent magnet at an instant the electromagnet is de-energized is augmented due to the remanent magnetism of the electromagnet and to the coercive force of the permanent magnet. The restraint excersized on the magnetic mass member from the permanent magnet therefore diminished gradually after the electromagnet has been de-energized so that the magnetic ball or pendulum subjected to an acceleration higher than the predetermined rate tends to stay in the rest position for a moment or fail to be moved from the rest position even in the absence of the magnetic force from the electromagnet. This results in a retarded or belated timing or a failure of actuation of the switching device and accordingly the protector unit.

The present invention thus has a further object of providing an improved inertia-responsive switching device which is capable of being actuated rapidly and reliably in response to an acceleration higher than a predetermined rate.

It is further and another object of the present invention to provide an improved inertia-responsive switching device having an inertia-responsive magnetic mass member which can be freed from a magnetic restraint momentarily when subjected to an acceleration higher than a predetermined rate.

It is further and another object of the invention to provide an improved inertia-responsive switching device using a combination of an electromagnet and an inertia-responsive magnetic mass member wherein the mass member is substantially free from the influence of the remanent magnetism of the electromagnet when moved from the rest position.

The inertia-responsive switching device adapted to accomplish these particular objects uses the first biasing means in the form of a resilient mechanical biasing means such as a preload spring urging the magnetic mass member to the rest position spaced apart from the stationary contact. The preload spring should be selected so that it has a spring constant suitable to be overcome by a force of inertia resulting from an acceleration higher than the previously mentioned first predetermined rate.

Where desired, the control means of the switching device of the character above described may further comprise a collision detecting switch which is connected in parallel with the vehicle-velocity responsive switch across the solenoid coil of the second biasing means. This collision detecting means is adapted to be closed when subjected to a mechanical pressure greater than a predetermined magnitude or to deformation of a suitable rigid member of the motor vehicle as caused by forceful contact of the motor vehicle with an obstruction during the collision condition. The collision detecting switch in itself is usually mounted on the front or rear side of the bumper, on the bumper stay positioned inboardly of the bumper, within the engine compartment, or on a structural element of the trunk or door of the motor vehicle and responds to deformation of any of such members or to application thereto of a mechanical pressure greater than a predetermined magnitude in the event of a collision encountered by the motor vehicle. Typical of the collision detecting switch of this nature will be a rupturable or frangible type switch using a glass tube enclosing therein a thin wire or coated with an electrically conductive film. The glass tube is usually wrapped in a container of an insulating material such as rubber or ductile plastics. Where the collision detecting switch having this construction is placed on prolonged use, the switch is subject to ingress of moisture or dirt and/or to an attack of sulpher dioxide contained in the atmosphere with the resultant deterioration of its performance quality. This tendency will be pronounced especially where the switching device is located at such places as to be exposed to mud and rain or to flicks from the road surface. Where the inertia-responsive switching device according to the present invention is to include the collision detecting switch, it is preferred that the switch be free from these drawbacks. The present invention therefore has still another objective to provide an inertia-responsive switching device including a collision detecting switch element which is capable of maintaining its performance quality even though the switch elements is used for an extended period of time and located at those places of the motor vehicle which are subject to various chemical and mechanical attacks.

The features and benefits of the inertia-responsive switching device having the above described general construction will be more apparently appreciated upon perusal of the following description taken in conjunction with the accompanying drawings in which like reference numerals and characters designated corresponding parts and in which.

Figure 1:
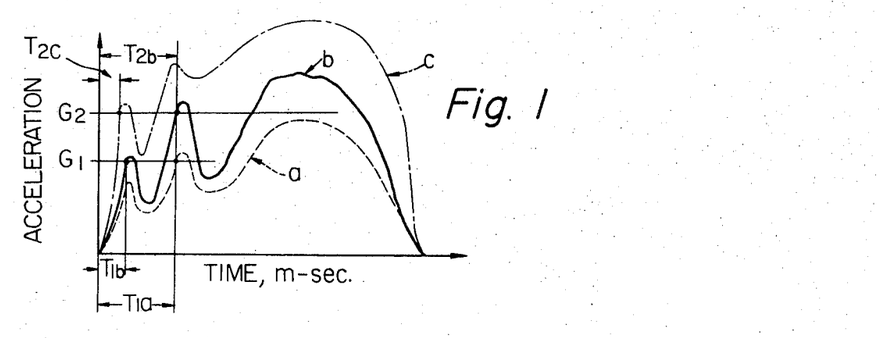
FIG. 1 is a graph showing examples of the waveforms of the accelerations developed under various collision conditions.

Reference is first made to FIG. 1. As previously discussed, the higher the vehicle velocity, the higher the rates of acceleration developed as a result of the collision of the motor vehicle. This is apparently ascertained from the graph of FIG. 1, in which curves $a$, $b$ and $c$ indicate waveforms of the accelerations developed in the motor vehicles when the collisions are encountered by the vehicles being driven at velocities $Va$, $Vb$ and $Vc$, respectively, where $Va<Vb<Vc$. For the complete assurance of protection of the vehicle occupants during the collision condition, it is imperative that the safety device be actuated only when ac acceleration higher than a predetermined rate is developed as a result of the collision and that the safety device be kept inoperative in response to an impact or shocks of relatively light degree which is unlikely to invite a serious collision condition and accordingly an injury of the vehicle occupant. The switching device for actuating the protector unit of the safety device should therefore be closed when and only when the motor vehicle encounters a collision while cruising at a velocity higher than, for example, the level of $Vb$ and be kept open when the motor vehicle is subjected to an impact while cruising at a velocity lower than $Va$. In view, moreover, of the fact that an appreciable delay is involved for the protector unit to be actuated to the fully protective position, it is important that the switching device for the protector unit be actuated at an incipient stage of the collision condition as previously pointed out. When, thus, the collision is encountered when the motor vehicle is being driven at a velocity $Vb$, the switching device should be closed within a time interval of $T_{1b}$ which is in terms of microseconds as seen in FIG. 1. Where the switching device is of the type which is responsive to a force of inertia, it is required to be closed in response to a rate of acceleration $G_1$ which is developed at time $T_{1b}$ from the moment at which the collision is first enountered. This rate of acceleration $G_1$ is, however, lower than the peak value of the rate of acceleration developed when the motor vehicle being driven at a velocity $Va$ encounteres a collision and thus also developed within a time interval of $T_{1a}$ as seen in FIG. 1. This means that the inertia-responsive switching device arranged to be responsive to an acceleration higher than the rate $G_1$ is actuated objectionably when the collision condition indicated by curve $a$ in FIG. 1 is encountered by the motor vehicle. The drawback of this nature is eliminated in the prior art motor vehicle safety device having the general construction illustrated in FIG. 2. The safety device, shown merely in a diagrammatic form, includes a protector unit 20 which is usually an inflatable protector bag or a stretchable protector net as previously mentioned. This protector unit 20 is actuated to the protective position by suitable actuating means 22 which is in the form of a normally closed container of gas under pressure where the protector unit 20 is of the type using the inflatable bag. The actuating means 22 is controlled by a switching circuit including an inertia-responsive switch 24 and a vehicle-velocity-responsive switch 26 which are connected in series between an input terminal of an electric circuit of the actuating means 22 and a power source 28. The inertia-responsive switch 24 is adapted to be closed in response to ac acceleration higher than the previously mentioned rate $G_1$ while the vehicle-velocity-responsive switch 26 is adapted to be closed in response to a vehicle velocity higher than the level $Vb$. Through this arrangement of the switching circuit, the actuating means 22 remains inoperative when an impact is exerted on the motor vehicle while the motor vehicle is being driven at a relatively low velocity.

Figure 2:
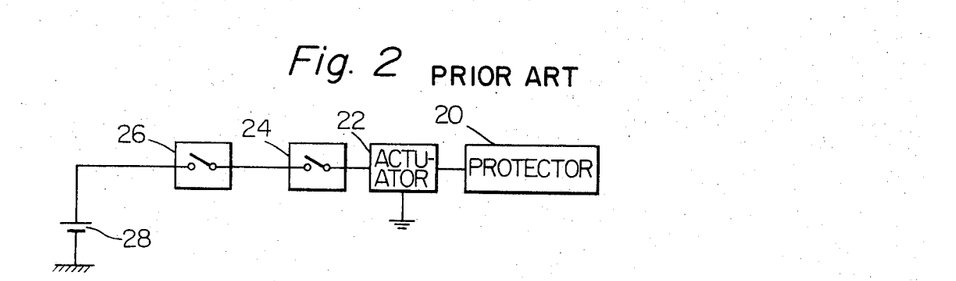
FIG. 2 is a schematic diagram showing a basic construction of a typical example of the prior art motor vehicle safety device using an inertia-responsive switch and a vehicle-velocity-responsive switch.

Actually, however, it is sometimes experienced that a motor vehicle is brought into collision by another vehicle while the former is being at a relatively low speed or during parking. Under this condition, the vehicle-velocity-responsive switch 26 remains open and accordingly the actuating means 22 is kept inoperative although the protector unit 20 should be actuated to the protective position. The safety device thus fails to protect the vehicle occupant from injury. When, moreover, the motor vehicle encounters a collision while skidding on a slippery road surface, the vehicle-velocity-responsive switch 24 invariably remains open so that the protector unit 20 fails to be actuated. The present invention contemplates elimination of all these drawbacks which are inherent in the prior art motor vehicle safety device of the described construction.

Figure 3:
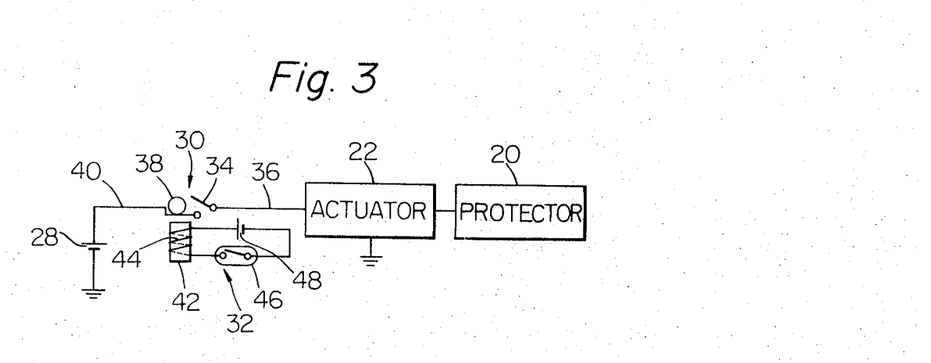
FIGS. 3 to 6 are diagrammatic views showing various preferred embodiments of the inertia-responsive switching device according to the present invention.

Referring to FIG. 3, the inertia-responsive switching device embodying the present invention includes a normally open switching circuit 30 intervening between the actuating means 22 for the protector unit (not shown) and the power source 28 and a switch control unit 32. The switching circuit 30 is largely made up of a stationary contact 34 connected through a line 36 to the input terminal of the electrical circuit of the actuating means 22 and an inertia-responsive mass member 38 constantly connected through a line 40 to the power source 28. This inertia-responsive mass member 38 is formed of an electrically conductive ferromagnetic material and thus serves as a movable contact cooperating with the stationary contact 34. The inertia-responsive mass member 38 is in the embodiment shown in the form of a solid ball resting on a conductor plate connected to the line 40 and adapted to roll on the conductor plate in response to a force of inertia imparted thereto. The switch control unit 32, on the other hand, includes a permanent magnet 42 which is positioned underneath or alongside the solid magnetic ball 38. The permanent magnet 42 attracts the magnetic ball 38 and thus urges it to a rest or inoperative position which is spaced apart from the stationary contact 34. It is, in this instance, important that the permanent magnet 42 be so selected as to build up a magnetic field having an intensity which is operable to retain the magnetic ball in the rest position when the ball is subjected to a force of inertia at the previously mentioned rate of acceleration $G_1$. An exciting coil 44 is wound on this permanent magnet 42 in such a direction as to build up, when energized, a magnetic field having poles which are in agreement with the poles of the magnetic field constantly established by the permanent magnet 42. When, thus, the exciting coil 44 is energized, then the magnetic ball 38 is subjected not only to the attractive force exerted by the permanent magnet 42 but to an attractive force produced by interaction of the magnet and the exciting coil 44. A vehicle-velocity-responsive switch 46 is connected across the exciting coil 44 through a power source 48. This vehicle-velocity-responsive switch 46 is adapted to be open in response to a vehicle velocity higher than a predetermined level of, for example, $Vb$ previously mentioned and to close responsive to a vehicle velocity lower than the particular limit. The number of turns of the exciting coil 44 and probably the capacity of the power source 48 should be so selected as to develop a magnetic field having an intensity predetermined in a manner that the combined magnetic forces from the permanent magnet 42 and the exciting coil 44 amount to a magnitude which is balanced with a force of inertia with a predetermined rate of acceleration $G_2$ indicated in the graph of FIG. 1. This rate of acceleration $G_2$ is predetermined so that the magnetic ball 38 can be freed of the restraint of the combined magnetic forces from the permanent magnet 42 and the exciting coil 44 when subjected to a force of inertia with an acceleration higher than the particular rate when the motor vehicle is being driven at a relatively low velocity, viz., a velocity lower than $Vb$ for example.

When, more specifically, the motor vehicle is being driven at a velocity lower than $Vb$ or held at a standstill, the vehicle-velocity-responsive switch 46 is closed and accordingly the exciting coil 44 is kept energized from the power source 48 so that the magnetic ball 38 is subjected to a restraint resulting from the combined magnetic forces from the permanent magnet 42 and the exciting coil 44. It therefore follows that the magnetic ball 38 remains at the rest or inoperative position spaced apart from the associated stationary contact 34 when subjected to a force of inertia smaller than the combined magnetic forces, viz., to an acceleration lower than the predetermined rate $G_2$. If, however, the motor vehicle encounters a collision developing a force of inertia with an acceleration higher than the rate $G_2$, the magnetic ball 38 is moved from the rest position against the combined magnetic forces and abuts to the stationary contact 34 within a time interval of $T_{2b}$ indicated in FIG. 1. An electrical connection is now completed between the input terminal of the actuating means 22 and power source 28 through the stationary contact 34 and the magnetic ball 38 which, under this condition, serves as a movable contact. The actuating means 22 is consequently initiated into action so that the protector unit 20 is actuated to the protective position intervening between the vehicle occupant and the certain structural parts of the vehicle cabin, as previously noted.

When, on the other hand, the motor vehicle is being driven at a velocity higher than the predetermined level of V$b$ for example, the vehicle-velocity-responsive switch 46 is open so that the exciting coil 44 remains de-energized. Under this condition, the magnetic ball 38 in the rest or inoperative position is subjected to the attractive force from the permanent magnet 42 alone, viz., to a reduced restraint which is balanced with a force of inertia with the predetermined rate of acceleration $G_1$. If, in this condition, the motor vehicle encounters a collision of such a magnitude as to develop a force of inertia with an acceleration higher than the predetermined rate $G_1$, then the magnetic ball 38 is freed of the restraint of the magnetic force from the permanent magnet 42 and moved from the rest or inoperative position into contact with the stationary contact 34 within a time interval of $T_{1b}$ (see FIG. 1), thereby completing the electrical connection between the input terminal of the actuating means 22 and the power source 28.

It will now be appreciated from the foregoing description that the inertia-responsive switching device of the construction shown in FIG. 3 is adapted to energize the actuating means 22 within the time interval of $T_{1b}$ in response to an acceleration higher than the rate $G_1$ during high-speed driving of the motor vehicle and within the time interval of $T_{2b}$ in response to an acceleration higher than the rate $G_2$ (which is greater than $G_1$) during low-speed driving or in a rest or skidding condition of the motor vehicle. If the collision is encountered by the motor vehicle while the vehicle is being driven at a velocity V$c$ as indicated by curve $c$ in FIG. 1, then the switching device responds to the collision condition and energizes the actuating means for the protector unit within a time interval of $T_{2c}$, viz., practically instantaneously when the motor vehicle bursts into the collision condition.

Figure 4:
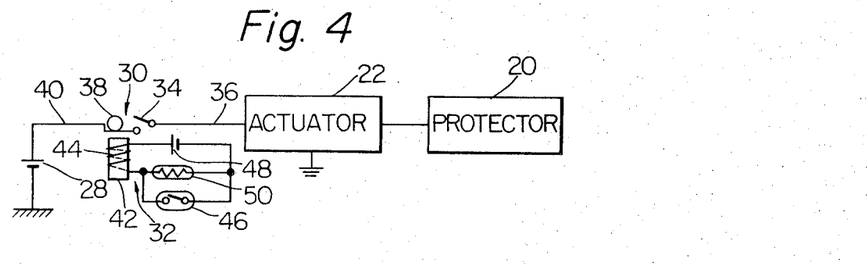

A modification of the embodiment above described is illustrated in FIG. 4. The modified embodiment herein shown is constructed essentially similarly to the embodiment of FIG. 3, differing only in that the control unit 32 for the switching circuit 30 includes a repturable type collision detecting switch 50 which is connected in parallel with the vehicle-velocity-responsive switch 46 across the exciting coil 44. This rupturable type collision detecting switch may be of any of the constructions presently known, such as for example the one using a glass tube containing therein a small-gage wire or having a coating of an electrically conductive material such as silver. In the embodiment herein shown, the collision detecting switch 50 is adapted to be normally closed and to be opened upon sensing of an unusual deformation or dislocation of a member on which the switch is mounted or in response to direct application thereto of a mechanical pressure greater than a predetermined limit as caused by the collision of the motor vehicle.

When, thus, the motor vehicle is being driven at a velocity higher than the predetermined level, the vehicle-velocity-responsive switch 46 is open and the collision detecting switch 50 closed. The exciting coil 44 wrapped around the permanent magnet 42 is consequently kept energized from the power source 48 so that the magnetic ball 38 is restrained by the combined magnetic forces from the permanent magnet 42 and the exciting coil 44. The magnetic ball 38 is in this manner prevented from being relocated from the rest or inoperative position unless a force of inertia is produced therein at an acceleration higher than the predetermined rate $G_2$ previously mentioned. The actuating means 22 for the protector unit 20 is thus held at rest when an impact or shocks of a relatively light degree is imparted to the motor vehicle even though the motor vehicle is cruising at a relatively high velocity. When, however, the motor vehicle encounters the collision while being driven at a relatively high velocity and accordingly the collision detecting switch 50 is forcefully pressed upon and/or unusual deformation or dislocation of the member carrying the switch is brought about, then both the vehicle-velocity-responsive switch 46 and the collision detecting switch 50 open. The supply of power to the exciting coil 44 is instantaneously interrupted so that the restraint on the magnetic ball 38 is weakened in the absence of the magnetic field built up by the interaction of the permanent magnet 42 and the exciting coil 44. If, thus, the acceleration produced in the magnetic ball 38 is higher than the rate $G_1$, the magnetic ball 38 is moved from the rest position against the attractive force from the permanent magnet 42 and abuts to the stationary contact 34 so that the actuating means 22 is energized from the power source 28 and accordingly the protector unit 20 is actuated to the protective position. If, on the other hand, the motor vehicle encounters a collision while being driven at a relatively low speed or during a rest or skidding condition, the velocity-responsive switch 46 is closed so that the exciting coil 44 is energized and accordingly the magnetic ball 38 is subjected to the restraint of the combined magnetic forces from the permanent magnet 42 and the exciting coil 44 even though the collision detecting switch 50 may be kept open. The protector unit 20 is in this condition prevented from being actuated even though an impact of a relatively light degree is imparted to the motor vehicle.

Figure 5:
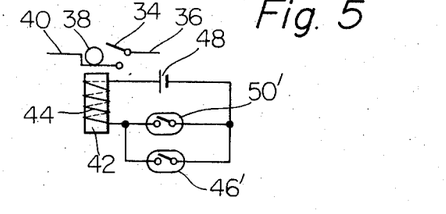

Although the vehicle-velocity-responsive switch 46 and the collision detecting switch 50 in the embodiment shown in FIG. 4 have been assumed to be of the normally-closed types, such is merely by way of example and thus the switches may be constructed as the normally-open types where desired. FIG. 5 illustrates an example of such embodiment wherein the normally-open vehicle-velocity-responsive and collision detecting switches are designated by reference numerals 46' and 50', respectively. It is, in this instance, important that the exciting coil 44 be would on the permanent magnet 42 or the power source 48 arranged in such a manner that the magnetic field built up by the interaction of the permanent magnet 42 and the exciting coil 44 has poles which are opposite to the poles of the constant magnetic field established by the permanent magnet per se. Where the switching arrangement of this nature is used, the magnetic ball 38 is subjected to the restraint of the combined magnetic forces corresponding to the rate of acceleration $G_2$ under the relatively high speed driving condition of the motor vehicle in which the velocity-responsive switch 46' is kept closed. In the event the motor vehicle encounters a collision while being driven at a relatively low velocity or during a rest or skidding condition, then the vehicle-velocity-responsive switch 46' is open so that the magnetic ball 38 is subjected to a restraint of the magnetic force corresponding to the rate of acceleration $G_1$ if the collision detecting switch 50' is open and to a restraint of the combined forces corresponding to the rate of acceleration $G_2$ if the collision detecting switch 50' is closed. The vehicle-velocity-responsive switch 46' of the normally-open type may also be used in the embodiment shown in FIG. 3 in lieu of the normally-closed switch 46, where desired. The end effects of the inertia-responsive switching devices thus using the normally-open type switch or switches are entirely similar to those described on the embodiments shown in FIGS. 3 and 4 and, thus, description thereof may not be herein repeated.

Figure 6:
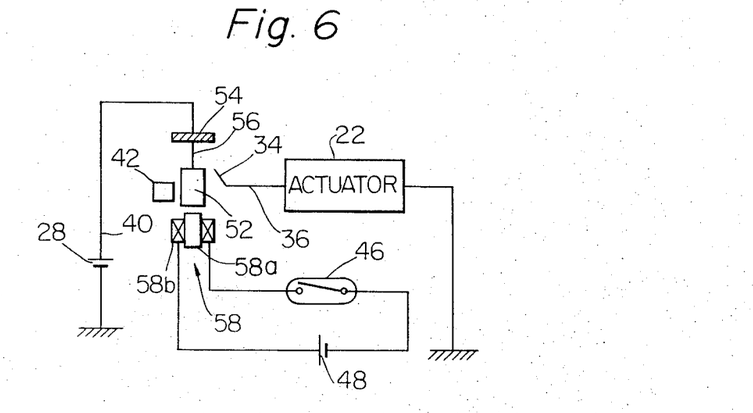

FIG. 6 illustrates still another preferred embodiment of the inertia-responsive switching device according to the present invention. The switching device herein shown uses the inertia-responsive magnetic mass member in the form of a megnetic pendulum 52 which is suspended from a support 54 through a conductor 56 and which is positioned at a spacing from the stationary contact 34. The pendulum 52 is formed of an electrically conductive ferromagnetic material, similarly to the magnetic ball previously described. The stationary contact 34 is connected to the input terminal of the electrical circuit of the actuating means 22 for the protector unit (not shown) through the line 36 while the conductor 56 secured to the support 54 is connected to the power source 28 through the line 40. The control unit for the switching circuit thus constructed includes a permanent magnet 42 which is positioned alongside the magnetic pendulum 52 and opposite to the stationary contact 34 for thereby biasing the magnetic pendulum to a rest or inoperative position which is remote from the stationary contact 34. Underneath the magnetic pendulum 52 in the rest position is positioned an electromagnet 58 which comprises a core 58a extending toward the bottom of the pendulum 52 and a solenoid coil 58b surrounding the core 58a, as shown. The solenoid coil 58b is connected at its terminals to a power source 48 through suitable switch means such as for example the vehicle-velocity-responsive switch 46 as shown and, though not shown, the collision detecting switch 50 connected in parallel with the vehicle-velocity-responsive switch.

The performance characteristics of the control unit above described are essentially similar to those of the embodiments previously described so that the magnetic pendulum 52 is biased to the rest position by the combined magnetic forces from the permanent magnet 42 and the electromagent 52, viz., corresponding to the force of inertia with the predetermined rate of acceleration $G_2$ when the motor vehicle is being driven at a relatively high velocity and by the magnetic force from the permanent magnet 42 along, viz., corresponding to the force of inertia with the predetermined rate of acceleration $G_1$ when the motor vehicle is being driven at a relatively low velocity or during a rest or skidding condition of the vehicle. It is apparent that the magnetic pendulum 52 which is formed of the electrically conductive material surves as a movable contact when moved from the rest position and abuts to the stationary contact during the collision condition encountered by the motor vehicle.

Figure 8:
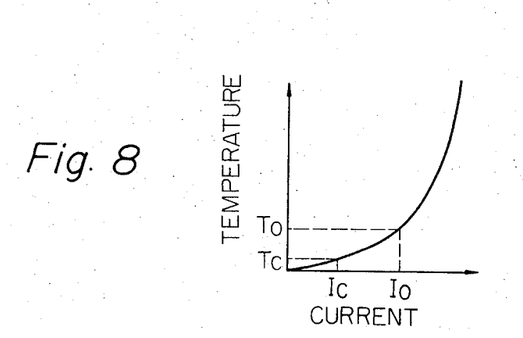
FIG. 8 is a graph showing a curve indicating a relation between an electric current supplied to a solenoid coil and a temperature of the coil caused by the current.
Figure 9:
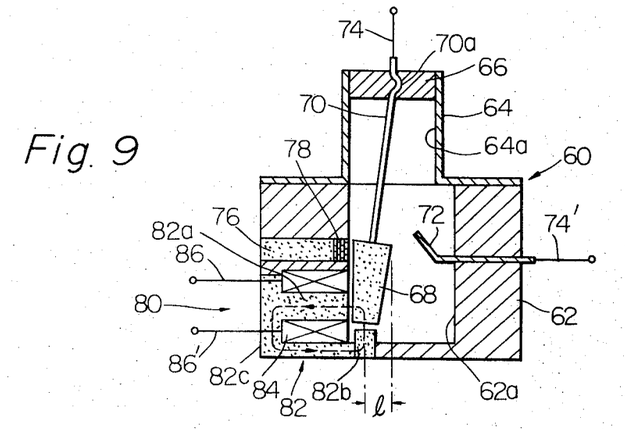
FIG. 9 is a sectional view of another preferred embodiment of the inertia-responsive switching device according to the present invention.
Figure 10:
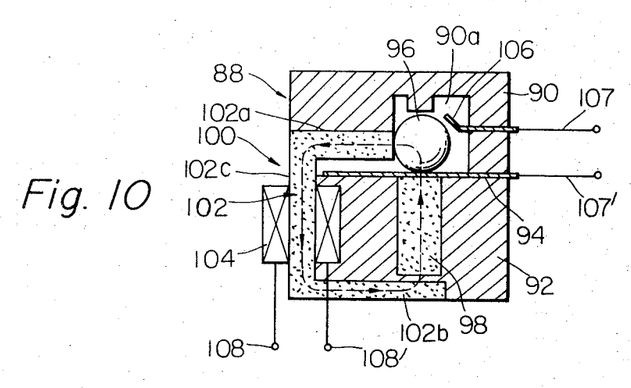
FIG. 10 is a view similar to FIG. 9 but shows a modification of the embodiment shown in FIG. 9.

In order to reliably prevent the protector unit from being actuated in response to relatively light shocks during low-speed driving of the motor vehicle, it is desired that the restraint resulting from the combined magnetic forces from the permanent magnet 42 and electromagnet 52 be predetermined to a considerably large value. If, in this instance, it is desired that the intensity of the magnetic field built up by the electromagnet 58 be increased from $g_1$ to $g_2$, then the current to be supplied to the solenoid coil 58b should be increased to Io as indicated by curve $d$ in FIG. 7. This is because of the fact that the electromagnet 58 and the magnetic pendulum 52 are arranged in a manner to construct an open magnetic circuit producing a considerable leakage flux. The supply of such a large current to the electromagnet results in generation of heat of a considerably high temperature as indicated by To in the graph of FIG. 8, thus inviting deterioration of the performance quality of the electromagnet and accordingly the control unit using such electromagnet when the switching device is used for a prolonged period of time. Where the switch or switches for controlling the electromagnet are of the normally-closed types, the particular tendency will be pronounced and a problem of increased power consumption will also arise. To eliminate all these drawbacks, it is preferred that arrangements be made so that a closed magnetic circuit be constructed through the electromagnet and the associated magnetic pendulum when the pendulum is held in the rest or inoperative position. FIGS. 9 and 10 illustrative embodiments which are adapted to achieve this purpose.

Referring to FIG. 9, the inertia-responsive switching device includes a receptacle 60 formed of an electrically insulating non-magnetic material. In the embodiment shown, this receptacle 60 is made up of a housing 62 having a chamber 62a and an upper extension 64 having a chamber 64a. The upper extension 64 is closed at its upper end by an end plug 66 which is formed of an electrically insulating material. A pendulum or weight 68 is suspended from the upper end plug 66 by a conductor element 70 extending through the chambers 62a and 64a in the housing 62 and upper extension 64, respectively. A stationary contact 72 which is usually formed of a pliable material is supported on the side wall of the housing 62. The stationary contact 72 projects into the chamber 62a in the housing 62 and terminates in close proximity to the magnetic pendulum or weight 68. The conductor element 70 leading from the magnetic pendulum or weight 68 is connected to a lead 74 while the stationary contact 72 is connected to a lead 74'. These leads 74 and 74' are connected between the input terminal of the electrical circuit of the actuating means for the protector unit and the power source, though not illustrated in FIG. 9.

Opposite to the leading end of the stationary contact 72 across the magnetic pendulum or weight 68 is positioned a permanent magnet 76 which is embedded in the side wall of the housing 62. Where desired, a number of non-magnetic spacer elements 78 which may be formed of aluminium or copper may be also embedded in the side wall of the housing 62 for intervening between the magnetic pendulum or weight 68 and the permanent magnet 76. These spacer elements 78 are useful for adjusting the intensity of the magnetic field acting upon the pendulum or weight by varying the distance between the permanent magnet 78 and the magnetic pendulum or weight 68, viz., the number and/or the thickness of the spacer elements. An electromagnet 80 is positioned below the permanent magnet 76 in a manner to attract the magnetic pendulum or weight 68 away from the stationary contact 72 in cooperation with the overlying permanent magnet 76 when energized. More specifically, the electromagnet 80 comprise a magnet core 82 having an upper arm portion 82a extending substantially horizontally toward and terminating at a close proximity to the side face of the magnetic pendulum or weight 68 opposite to the stationary contact 72, when the pendulum or weight is held or inoperative position shown, a lower upright portion 82b projecting substantially upwardly from the bottom wall of the housing 62 toward terminating at a close proximity to the bottom end of the magnetic pendulum or weight 68 in the rest position, and an intermediate portion 82c formed on the side and bottom walls of the housing 62 for interconnecting the arm and upright portions 82a and 82b, respectively, to each other. It is, in this instance, important that the lower upright portion 82b of the core 82 be so positioned relative to the housing 62 as to be appropriately offset from the center of the magnetic pendulum or weight in a freely suspended condition, viz., have its center spaced a distance $l$ from a vertical line perpendicular to the upper end of the conductor element 70 at which the conductor element is anchored to the upper end plug 66. A solenoid coil 84 is wound on the upper arm portion 82a of the core 82 in a manner to build up, when energized, a magnetic field to act upon the magnetic pendulum or weight 68 in combination with the magnetic field established by the permanent magnet 76. The solenoid coil 84 has terminals which are connected through leads 86 and 86' across suitable switch means such as the vehicle-velocity-responsive switch or the parallel combination of the vehicle-velocity-responsive and collision detecting switches of the character previously described. The solenoid coil 84 should be wound on the arm portion 82a of the core in a direction adapted to build up a magnetic field having poles which are in agreement with or opposite to the poles of the magnetic field constantly established by the permanent magnet 76 depending upon the types of the switch means for use therewith, for the reason previously described.

With the inertia-responsive switching device constructed in this manner, the magnetic pendulum or weight 68 is subjected to different restraints one of which results from the magnetic field built up by the permanent magnet 76 alone and the other of which results from the combined magnetic fields from the permanent magnet 76 and the electromagnet 80. When the magnetic pendulum or weight 68 is freed from either of these restraints in response to a force of inertia with an acceleration higher than the previously defined rate $G_1$ or $G_2$ depending upon the conditions of the switch or switches connected to the solenoid coil 84 of the electromagnet 80, the pendulum or weight 68 is moved against the particular restraint to abut to the stationary contact 72 for interconnecting the leads 74 and 74' between the actuating means for the protector unit and the power source therefor.

The inertia-responsive switching device above described features a substantially closed magnetic circuit which is established through the upper arm portion 82a, intermediate portion 82c and lower upright portion 82b of the core 82 and the magnetic pendulum or weight 68 and between the permanent magnet 76 and the magnetic pendulum or weight when the pendulum or weight is held in the rest position attracted toward the permanent magnet 76 and the electromagnet 80.

Figure 7:
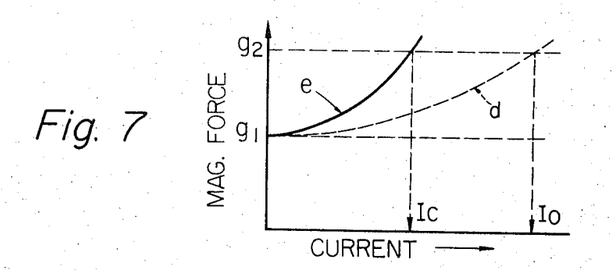
FIG. 7 is a graph showing curves indicating relations between magnetic forces and electric currents required to build up the magnetic forces by electromagnets which are arranged to establish open and closed magnetic circuits.

By virtue of the closed magnetic circuit in the inertia-responsive switching device above described, the production of leakage flux is minimized so that the electromagnet 80 is capable of producing a satisfactorily great magnetic force with use of a sufficiently small current as indicated by Ic in FIG. 7. Such a reduced current is reflected by a minimized generation of heat in the coil of the electromagnet as indicated by Tc in the graph of FIG. 8.

In the construction shown in FIG. 9, the conductor element 70 suspending the magnetic pendulum or weight 68 may be anchored to the upper end plug 66 through a curved 70a which is formed at its upper end so that the magnetic pendulum or weight 68 is prevented from being moved downwardly by its own gravity and accordingly the preset position of the pendulum or weight relative to the permanent magnet 76 and electromagnet 80 can be maintained accurately during use of the switching device. Where desired, moreover, the lower upright portion 82b of the core 82 of the electromagnet 80 may be in the form of a screw of a magnetic material. The magnetic screw is fitted on the bottom extension of the intermediate portion 82c of the core 82 and is movable toward and away from the bottom end of the overlying magnetic pendulum or weight 68 so that the distance between the pendulum or weight 68 and the lower upright portion 82b and accordingly the intensity of the magnetic field acting upon the pendulum or weight from the particular portion of the core 82 can be adjusted.

FIG. 10 illustrates a modification of the inertia-responsive switching device of FIG. 9. The switching device herein shown uses the inertia-responsive magnetic mass member which is in the form of a magnetic ball formed of an electrically conductive ferromagnetic material similarly to the embodiments shown in FIGS. 3 to 5. Referring to FIG. 10, a receptacle 88 is made up of upper and lower halves 90 and 92 which are separated from each other by a horizontal plate 94 of an electrically conductive material. The upper half 90 of the receptacle 88 has formed therein a chamber 90a movably accommodating therein an electrically conductive magnetic ball 96 resting upon the horizontal plate 94 positioned at the bottom of the chamber 90a. Underneath the horizontal plate 94 is positioned a permanent magnet 98 which is embedded in the lower half 92 of the receptacle in a manner to have its opposite poles at the top and bottom thereof. The magnetic ball 96 on the horizontal conductor plate 94 is thus urged to a rest position immediately overlying this permanent magnet 98. An electromagnet 100 comprises a core 102 having one end portion 102a extending substantially horizontally toward and terminating alongside the magnetic ball 96 in the rest position and the other end portion 102b extending at a close proximity to the bottom end of the permanent magnet 98. The core 102 further has an intermediate portion 102c substantially vertically extending along the side wall of the lower half 92 of the receptacle and interconnecting the upper and lower end portions 102a and 102b, respectively, to each other. This intermediate portion 102c is surrounded by a solenoid coil 104 for establishing a magnetic field acting upon the magnetic ball 96 in cooperation with the magnetic field built up by the permanent magnet 98. Thus, the upper end portion 102a, intermediate portion 102c and lower end portion 102b of the core 102, the permanent magnet 98 and the magnetic ball 96 in the rest position constitute a closed magnetic circuit. A stationary contact 106 extends through the side wall of the upper half 90 of the receptacle 88 into the chamber 90a and terminates at a position opposite to the upper end portion 102a of the core 102 beyond the magnetic ball 96. The stationary contact 106 and the horizontal conductor plate 94 are connected to leads 107 and 107', respectively, which are connected between the actuating means for the protector unit of the safety device and the power source for the actuating means. The solenoid coil 104, on the other hand, has terminals which are connected to leads 108 and 108', respectively, connected across suitable switch means such as the vehicle-velocity-responsive switch or the parallel combination of the vehicle-velocity-responsive switch and the collision detecting switch as previously mentioned. The operation and advantages of the embodiment above described will be self-explanatory from the discussion given on the preceding embodiments of the present invention and thus repeated description thereof may not be resorted to.

Figure 11:
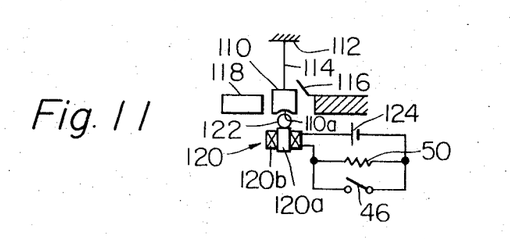
FIG. 11 is a diagrammatic view showing still another preferred embodiment of the inertia-responsive switching device according to the present invention.

FIG. 11 illustrates still another preferred embodiment of the inertia-responsive switching device according to the present invention wherein the inertia-responsive magnetic mass member is biased to its rest or inoperative position by means of a magnetic force built up by a permanent magnet or a combination of such magnetic force and a mechanical restraint which is created by a solenoid-operated plunger.

The intertia-responsive magnetic mass member in the embodiment herein shown is in the form of a weight 110 of an electrically conductive ferromagnetic material. The magnetic weight 110 is suspended from a stationary support 112 through a pliable conductor element 114 and is positioned relative to a stationary contact 116 which is usually in the form of a pliable conductor plate. The conductor element 114 and the stationary contact 116 are connected to leads which intervene between the electrical circuit of the actuating means for the protector unit and the power source therefor, though not illustrated herein. The control unit for the switching circuit thus made up of the magnetic weight 110, conductor element 114 and stationary contact 116 includes a permanent magnet 118 which is positioned opposite to the stationary contact 116 across the magnetic weight 110 for urging the magnetic weight to a rest or inoperative position which is spaced apart from the stationary contact 116. The control unit further includes a solenoid device 120 which is positioned below the magnetic weight 110 held in the rest position under the influence of the magnetic field acting thereupon from the permanent magnet 118. The solenoid device 120 includes an armature 120a directed toward the magnetic weight 110 in the rest position and a solenoid coil 120b which is wound on the armature 120a, the armature serving a plunger. A ball member 122 is mounted on or integral with the top of the solenoid-operated plunger 120a of the solenoid device 120 and is releasably received at its top in a rounded recess 110a which is formed in the bottom wall of the overlying magnetic weight 110. The solenoid coil 120b has terminals connected across a parallel connection of a vehicle-velocity-responsive switch 46 and a collision detecting switch 50 through a power source 124, the performance characteristics of these two switches being similar to those of the switches used in the embodiment shown in FIG. 4 or in the embodiment shown in FIG. 5.

When the solenoid-operated plunger 120a of the solenoid device 120 is in the lowered position with the ball member disengaged from the magnetic weight 110, the magnetic weight is subjected to the magnetic field established by the permanent magnet 118 alone. When, however, the solenoid-operated plunger 120a is in the raised position which is illustrated, then the magnetic weight 110 is subjected not only to the attractive force from the permanent 118 but to the mechanical restraint exerted thereon through engagement between the rounded recess 110a thereof and the ball member 122 on the plunger 120. It is, in this instance, apparent that the vehicle-velocity-responsive switch 46 and collision detecting switch 50 and the solenoid coil 120b should be so arranged that the solenoid-operated plunger 120a is in the lowered position when the motor vehicle is being driven at a relatively low velocity and in the raised position when the motor vehicle is being driven at a relatively high speed and/or the motor vehicle encounters an actual collision condition of a serious nature.

Figure 12:
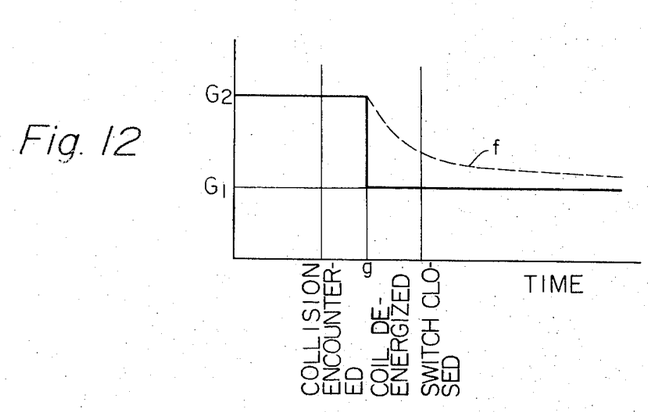
FIG. 12 is a graph showing changes of the magnetic forces built up by a permanent magnet in the presence and absence of a remanent magnetism exerted by an electromagnet.
Figure 13:
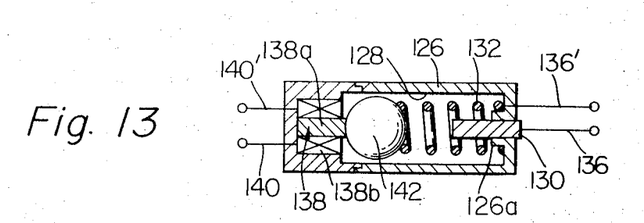
FIG. 13 is a cross sectional view showing still another preferred embodiment of the inertia-responsive switching device according to the present invention.

The embodiments of the inertia-responsive switching device according to the present invention thus far described are all directed to those in which the inertia-responsive magnetic mass member is subjected to the constant restraint or "first biasing force" which is built up by the permanent magnet coacting with the electromagnet or solenoid coil in a controlled fashion. This, however, is merely by way of example and, as such, the means to exert the constant restraint on the magnetic mass means may be in various other forms where desired.

Where the electromagnetic means is used in combination with the permanent magnet which is placed in the vicinity of the solenoid coil, the permanent magnet produces an augmented magnetic field under the influence of the magnetic field built up by the solenoid coil which is being energized. The permanent magnet, which is usually formed of a material subject to a remanent magnetization effect, continues to produce such an augmented magnetic field upon de-energization of the solenoid coil with the result that the magnetic force exerted upon the magnetic mass member fails to be drop in a clear-cut fashion and droops relatively slowly due to the presence of the remanent magnetism therein after the solenoid coil has been disconnected from the power source, as indicated by curve f in FIG. 12. This causes the magnetic mass member to be subjected to a gradually diminishing restraint so that the switching device is liable to be initiated into action at a retarded or belated timing or, in the worst case, fail to be actuated during a serious collision condition. FIG. 13 illustrates an embodiment of the inertia-responsive switching device which is free from this particular drawback.

Referring to FIG. 13, the inertia-responsive switching device has a receptacle 126 formed of an electrically insulating non-magnetic material. The receptacle 126 has formed therein a chamber 128 which is elongated in a direction in which an impact is transferred to the switching device during a collision condition. A stationary contact 130 in the form of an elongated conductor element extends through one end wall of the receptacle 126 and projects into the elongated chamber 128. A preload compression spring 132 formed of an electrically conductive material is seated at one end on this end wall surrounding the stationary contact 130. To assure electrical insulation between the stationary contact 130 and compression spring 132, an annular extension 126a may be formed on the inner face of the end wall of the receptacle 126 for surrounding a root portion of the stationary contact 130 as illustrated. The stationary contact 130 and compression spring 132 are connected to leads 136 and 136' which intervene between the actuating means for the protector unit and the power source to energize the actuating means. On the other end wall of the receptacle 126 is mounted an electromagnet 138 which comprises a core 138a extending toward the stationary contact 130 spaced apart therefrom through the elongated chamber 128 and a solenoid coil 138b which is wound on the core 138a. This solenoid coil 138b has terminals 140 and 140' which are connected to the vehicle-velocity-responsive switch or the parallel connection of the vehicle-velocity-responsive and collision detecting switches as previously described. Between the leading ends of the core 138a of the electromagnet 138 and the compression spring 132 is interposed an inertia-responsive magnetic mass member 142 in the form of a ball formed of an electrically conductive ferromagnetic material. This magnetic ball 142 is intended to serve not only as the inertia-responsive magnetic mass member but as a movable contact interconnecting the stationary contact 130 and compression spring 132, viz., the leads 136 and 136' to each other when flung to the stationary contact 130 against the action of the preload compression spring 132 by a force of inertia.

When, thus, the solenoid coil 138b of the electromagnet 138 is kept de-energized, the magnetic ball 142 is forced against the tip of the core 138a thereof by the action of the compression springs 132. If, under this condition, the magnetic ball 142 is subjected to a force of inertia resulting from an acceleration higher than the predetermined rate ($G_1$), then the ball 142 is moved from the rest position and abuts to the leading end of the stationary contact 130 against the action of the compression spring 132, thereby completing an electrical circuit between the leads 136 and 136' through the stationary contact 130, ball 142 and compression spring 132 which are all formed of electrically conductive materials. When, on the other hand, the solenoid coil 138b of the electromagnet 138 is energized under the control of the switch means connected thereto, an attractive force is exerted on the magnetic ball 142 from the electromagnet 138 so that the magnetic ball is subjected not only to the restraint from the compression spring 132 but the restraint from the electromagnet 138. Under this condition, the magnetic ball 142 can be moved from the rest position only when it is subjected to a force of inertia resulting from an acceleration higher than the predetermined rate ($G_2$) which is balanced with the combined forces of the spring 132 and the magnetic field from the electromagnet 138.

The solenoid coil 138b of the electromagnet 138 is de-energized in response to a condition in which the motor vehicle is being driven at a velocity lower than a predetermined level and/or the motor vehicle encounters a serious collision. When the solenoid coil 138b is thus de-energized, the magnetic ball 142 is urged to the rest position only by the biasing force of the compression spring 132 the performance characteristics of which are substantially free from the remanent magnetism from the electromagnet 138. The biasing force acting upon the magnetic ball 142 drops in a clear-cut fashion at an instant when the solenoid coil 138b is de-energized as indicated by a plot g in the graph of FIG. 13 so that the switching device is capable of being closed at a proper timing during the collision condition. It is, in this instance, apparent that the coiled compression spring 132 may be replaced with any suitable resilient biasing means such as a leaf spring. Such a resilient biasing means is also applicable to any of the previously described embodiments such as illustrated in FIGS. 6, 9, 10 and 11. For the purpose of minimizing the influence of the remanent magnetism from the electromagnet without resorting to the use of the spring means, it will prove advantageous to have the core of the electromagnet formed of pure iron, magnetic soft iron, Permalloy or any other magnetic materials which are hardly subject to remanent magnetization.

The collision detecting switch which may be utilized in the control unit of the inertia-responsive switching device may be of the construction which is familiar to those skilled in the art. The switch of this type is mounted on the front or rear side of the bumper, bumper stay, engine compartment, trunk or door and is adapted to respond to a condition in which the member carrying the switch is deformed or dislocated forcefully or in which the switch per se is forcefully pressed upon. Typical example of the collision detecting switch of this nature is the rupturable or frangible type collision detecting switch using a glass tube containing therein a thin wire or having a coating of an electrically conductive material as previously mentioned. Such a glass tube is usually enclosed in an electrically insulating container of rubber or plastics. Problems are, however, pointed out in that the performance characteristics of the switch of the particular construction due to ingress of dirt or moisture into the container or an attack of sulpher dioxide in the atmosphere and that the switch is inoperable in a reliable condition for a prolonged period of time where it is likely to be exposed to mud or rain or to various flicks from the road surface during cruising of the motor vehicle. The rupturable type collision detecting switch for use in the inertia-responsive switching device according to the present invention may therefore be constructed preferably as shown in FIGS. 14 to 16.

Figure 14:
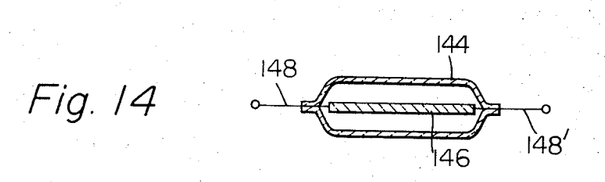
FIG. 14 is a longitudinal sectional view showing a preferred example of the rupturable type collision deecting switch for use in the inertia-responsive switching device of any of the constructions previously shown.
Figure 15:
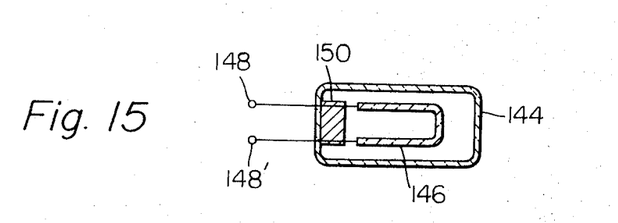
FIG. 15 is a view similar to FIG. 14 but shows a modification of the collision detecting switch therein shown.
Figure 16:
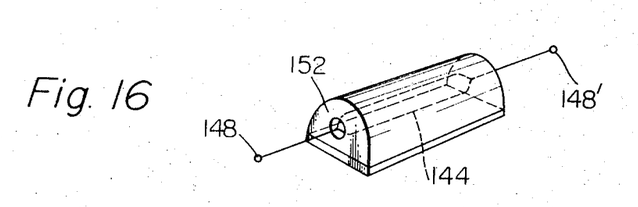
FIG. 16 is a perspective view showing a configuration of a container for the rupturable type collision detecting switch shown in FIGS. 14 or 15.

Referring to FIG. 14, a capsule 144 formed of a rupturable or frangible insulating material such as glass has accommodated therein an elongated rupturable conductor element 146 extending from one end of the capsule 144 to the other. The capsule 144 is hermetically sealed off and is preferably internally evacuated or filled with an inert gas such as nitrogen gas. The rupturable conductor element 146 may be a glass tube or rod which is coated with an electrically conductive material such as silver. The conductor element 146 is connected at its opposite ends to leads 148 and 148' which are drawn outwardly of the capsule 144 for connection to a suitable electric circuit such as the solenoid coil of the control unit of the switching device according to the present invention.

Where preferred, the rupturable conductor element 146 may be of a generally U-shaped configuration having its ends in parallel to each other as seen in FIG. 15. In this instance, the conductor element 146 should be connected to the leads 148 and 148' through an additional insulating element 150 attached to the end wall of the capsule 144.

The configurations, sizes and mechanical properties of the capsule 144 and conductor element 146 should be selected in consideration of the working places or conditions in which the switch is to be installed.

The capsule 144 of either of the constructions above described is encased within a container 152 of a pliable electrically insulating material such as rubber or ductile plastics with the leads 148 and 148' draw out of this container as seen in FIG. 16.

When, thus, the collision detecting switch having the above described construction is subjected to a forceful mechanical pressure resulting from direct application of an impact thereto or from unusual deformation or dislocation of the member on which the switch is mounted as caused by a collision of the motor vehicle with an obstruction, such a pressure is transferred to the capsule 144 through the container 152 so that the capsule 144 is broken into pieces. The conductor element 146 is consequently severed or broken, thereby disconnecting the leads 148 and 148' from each other.

Since the conductor element 146 is contained in the hermetically sealed capsule 144 which is internally evacuated or filled with the inert gas and since the capsule 144 is enclosed within the pliable insulating container 152, the conductor element 146 which may be coated with the conductive material is prevented from being exposed to the atmosphere while the switch is held inoperative. The performance characteristics of the rupturable type collision detecting switch above described is thus maintained substantially unchanged during prolonged use of the switch even under serious weather or driving conditions.

It will now be appreciated from the foregoing description that the motor vehicle safety device using the inertia-responsive switching device according to the present invention is capable of being actuated in a reliable fashion and at a proper timing in the event of a collision encountered by a motor vehicle because the switching device is so constructed as to initiate the protector unit of the safety device into action in response to varied forces of inertia depending upon the natures of the collisions encountered. The switch means for varying the inertia-responsive characteristics of the switching device has thus far been described as comprising the vehicle-velocity-responsive switch or the parallel combination of such switch and the cllision detecting switch. This, however, is not limitative of the present invention and thus any other types of switch such as for example a switch operating on a radar action may find a useful application in the switching device according to the present invention. It is also apparent that the various embodiments herein described and shown may be modified and changed in various manners where desired.

What is claimed is:

1. A inertia-responsive switching device for use in a motor vehicle safety device, comprising a stationary contact, an inertia-responsive magnetic mass member formed of an electrically conductive ferromagnetic material and having a rest position which is spaced apart from said stationary contact and an operative position contacting the stationary contact, first magnetic biasing means constantly exerting a first magnetic force on said magnetic mass member for urging the mass member to said rest position, the magnetic mass member being allowed to move from the rest position to said operative position when subjected to a force of inertia overcoming said first magnetic force, second magnetic biasing means operative to exert a second magnetic force on the magnetic mass member when actuated, the second magnetic force being combined with said first magnetic force for allowing said mass member to move from said rest position to said operative position in response to a force of inertia overcoming the combined first and second magnetic forces, and control means for actuating said second magnetic biasing means, said control means comprising a vehicle-velocity-responsive switch responsive to a vehicle velocity lower than a predetermined level for actuating said second magnetic biasing means to bias said mass member to said rest position.

2. An inertia-responsive switching device as claimed in claim 1, in which said control means further comprises a collision detecting switch which is responsive to an actual collision condition of the motor vehicle for controlling said second magnetic biasing means to be inoperative to bias said mass member to said rest position.

3. An inertia-responsive switching device for use in a motor vehicle safety device, comprising a stationary contact, an inertia-responsive magnetic mass member formed of an electrically conductive ferromagnetic material and having a rest position which is spaced apart from said stationary contact and an operative position contacting the stationary contact, first magnetic biasing means constantly exerting a first magnetic force on said magnetic mass member for urging the mass member to said rest position, the magnetic mass member being allowed to move from the rest position to said operative position when subjected to a force of inertia overcoming said first magnetic force, second magnetic biasing means operative to exert a second magnetic force on the magnetic mass member when actuated, the second magnetic force being combined with said first magnetic force for allowing said mass member to move from said rest position to said operative position in response to a force of inertia overcoming the combined first and second magnetic forces, and control means for actuating said second magnetic biasing means, said first magnetic biasing means comprising a permanent magnet positioned adjacent to said magnetic mass member, said second magnetic biasing means being operative to build up when actuated by said control means, a magnetic field having poles which are in agreement with the poles of the magnetic field established by said permanent magnet, said control means comprising a vehicle-velocity-responsive switch, which is open in response to a vehicle velocity higher than a predetermined level for maintaining said second magnetic biasing means de-energized, and which is closed in response to a vehicle velocity lower than said predetermined level for energizing said second magnetic biasing means.

4. An inertia-responsive switching device as claimed in claim 3, in which said control means further comprises a collision detecting switch connected in parallel with said vehicle-velocity-responsive switch and responsive to an actual collision condition of the motor vehicle for causing said second magnetic biasing means to be de-energized during the collision condition.

5. An inertia-responsive switching device for use in a motor vehicle safety device, comprising a stationary contact, an inertia-responsive magnetic mass member formed of an electrically conductive ferromagnetic material and having a rest position which is spaced apart from said stationary contact and an operative position contacting the stationary contact, first magnetic biasing means constantly exerting a first magnetic force on said magnetic mass member for urging the mass member to said rest position, the magnetic mass member being allowed to move from the rest position to said operative position when subjected to a force of inertia overcoming said first magnetic force, second magnetic biasing means operative to exert a second magnetic force on the magnetic mass member when actuated, the second magnetic force being combined with said first magnetic force for allowing said mass member to move from said rest position to said operative position in response to a force of inertia overcoming the combined first and second magnetic forces, and control means for actuating said second magnetic biasing means, said first magnetic biasing means comprising a permanent magnet positioned adjacent said magnetic mass member for attracting said mass member to said rest position and said second magnetic biasing means being operative to build up a magnetic field having poles which are opposite to the poles of the magnetic field established by said permanent magnet, said control means comprising a vehicle-velocity-responsive switch which is closed in response to a vehicle velocity higher than a predetermined level for maintaining said second magnetic biasing means de-energized and which is opened in response to a vehicle velocity lower than said predetermined level for energizing said second magnetic biasing means.

6. An inertia-responsive switching device as claimed in claim 5, in which said control means further comprises a collision detecting switch which is connected in parallel with said vehicle-velocity-responsive switch and which is responsive to an actual collision condition of the motor vehicle for causing said second magnetic biasing means to be energized during the collision condition.

* * * * *